United States Patent
Zhang (10) Patent No.: US 12,125,093 B2
(45) Date of Patent: Oct. 22, 2024

(54) COMMODITY RECOMMENDATION METHOD, SERVER, SHOPPING CART AND SHOPPING SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Menglei Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 406 days.

(21) Appl. No.: 17/471,649

(22) Filed: Sep. 10, 2021

(65) Prior Publication Data

US 2022/0084102 A1 Mar. 17, 2022

(30) Foreign Application Priority Data

Sep. 11, 2020 (CN) .................. 202010951273.X (51) Int. Cl.
*G06Q 30/0601* (2023.01)
*G06N 3/08* (2023.01)
(Continued)

(52) U.S. Cl.
CPC ........... *G06Q 30/0633* (2013.01); *G06N 3/08* (2013.01); *G06Q 30/0631* (2013.01); *G06T 7/70* (2017.01); *G06V 10/462* (2022.01); *G06V 20/64* (2022.01)

(58) Field of Classification Search
USPC ................................. 705/26.1–27.2
See application file for complete search history.

(56) References Cited

U.S. PATENT DOCUMENTS 10,540,700 B1   1/2020   Chilukuri
2003/0105682 A1*  6/2003  Dicker ............... G06Q 30/0253
                                                    705/26.8
(Continued)

FOREIGN PATENT DOCUMENTS

CN     1588400 A     3/2005
CN   107256513 A    10/2017
(Continued)

OTHER PUBLICATIONS

Ross systems releases RFID-to-go; new radio frequency identification (RFID) solution from ross systems enables manufacturers to meet compliance requirements and improve product traceability. (Mar. 6, 2006, Mar. 6, 2006). Business Wire Retrieved from https://dialog.proquest.com (Year: 2006).*

(Continued)

*Primary Examiner* — Jeffrey A. Smith
*Assistant Examiner* — Ashley D Preston
(74) *Attorney, Agent, or Firm* — Dority & Manning, P.A.

(57) ABSTRACT

A commodity recommendation method includes: receiving at least one image of a first commodity sent by a shopping cart, and the first commodity being a commodity placed in the shopping cart; inputting the at least one image into a commodity recognition model for commodity recognition to obtain commodity recognition information; inputting the commodity recognition information into a commodity recommendation model for purchase demand prediction to obtain at least one target recommended commodity; and sending information of the at least one target recommended commodity to the shopping cart.

12 Claims, 3 Drawing Sheets

(51) Int. Cl.
*G06T 7/70* (2017.01)
*G06V 10/46* (2022.01)
*G06V 20/64* (2022.01)

(56) References Cited

U.S. PATENT DOCUMENTS

| | | | |
|---|---|---|---|
| 2007/0033098 A1 | 2/2007 | Peters et al. | |
| 2011/0145051 A1 | 6/2011 | Paradise et al. | |
| 2011/0145093 A1* | 6/2011 | Paradise | G06Q 30/02 705/26.1 |
| 2016/0110794 A1* | 4/2016 | Hsiao | G06F 18/214 705/26.7 |
| 2019/0355041 A1* | 11/2019 | Sewak | G06Q 30/0643 |
| 2020/0027148 A1 | 1/2020 | Li et al. | |
| 2020/0327591 A1* | 10/2020 | Chilukuri | G08B 13/2462 |
| 2021/0256681 A1* | 8/2021 | Segal | G06N 3/045 |
| 2021/0312214 A1 | 10/2021 | Yang et al. | |

FOREIGN PATENT DOCUMENTS

| | | |
|---|---|---|
| CN | 107403345 A | 11/2017 |
| CN | 108229379 A | 6/2018 |
| CN | 108320213 A | 7/2018 |
| CN | 108764313 A | 11/2018 |
| CN | 109684538 A | 4/2019 |
| CN | 110148042 A | 8/2019 |
| CN | 110309832 A | 10/2019 |

OTHER PUBLICATIONS

Optimization and Research on Cross Selling Product Portfolio of Retail Enterprises (with English abstract and select sections), Thesis for Degree of Master, Capital University of Economics and Business, Mar. 2012, 70 pages.

Notification to Grant Patent Right for Invention (with English translation) received in corresponding CN Application No. 202010951273.X, dated Jun. 7, 2024, 8 pages.

First Office Action (with English translation) received in corresponding CN Application No. 202010951273.X, dated Apr. 30, 2024, 38 pages.

Beladev et al., "Recommender systems for product bundling", Knowledge-Based Systems, vol. 111, Aug. 13, 2016, pp. 193-206.

* cited by examiner

COMMODITY RECOMMENDATION METHOD, SERVER, SHOPPING CART AND SHOPPING SYSTEM

CROSS-REFERENCE TO RELATED APPLICATION

This application claims priority to Chinese Patent Application No. 202010951273.X, filed on Sep. 11, 2020, which is incorporated herein by reference in its entirety.

TECHNICAL FIELD

The present disclosure relates to the technical field of the Internet of Things, and in particular, to a commodity recommendation method, a server, a shopping cart and a shopping system.

BACKGROUND

In life, an enormous number of people choose supermarkets (or malls) for shopping. Shopping at supermarkets (or malls) can not only satisfy users' needs for purchasing daily necessities, but also satisfy users' physical shopping experience.

SUMMARY

In a first aspect, a commodity recommendation method is provided, which is applied to a server and includes: receiving at least one image of a first commodity sent by a shopping cart, the first commodity being a commodity placed in the shopping cart; inputting the at least one image into a commodity recognition model for commodity recognition to obtain commodity recognition information; inputting the commodity recognition information into a commodity recommendation model for purchase demand prediction to obtain at least one target recommended commodity; and sending information of the at least one target recommended commodity to the shopping cart.

In some embodiments, the at least one image includes at least two images, and the at least two images are images of the first commodity collected from different viewing angles. The inputting the at least one image into the commodity recognition model for commodity recognition to obtain the commodity recognition information includes: inputting the at least two images into the commodity recognition model for commodity recognition to obtain M pieces of commodity category information; M being an integer greater than 1; and obtaining difference information of the M pieces of commodity category information to obtain the commodity recognition information.

In some embodiments, before inputting the at least one image into the commodity recognition model for commodity recognition to obtain the commodity recognition information, the commodity recommendation method further includes: building an recognition network model, and the recognition network model including a feature extractor, which includes a plurality of convolutional neural networks, and an aggregation unit that performs aggregation processing on the plurality of convolutional neural networks; performing image processing and annotation on sample images to obtain training samples, tags annotated in a training sample including a boundary box of a sample commodity and a commodity category of the sample commodity, and the sample commodity being a commodity corresponding to a sample image; performing amplification processing on the training samples; and inputting the amplified training samples into the recognition network model for training to obtain the commodity recognition model.

In some embodiments, before inputting the commodity recognition information into the commodity recommendation model for purchase demand prediction to obtain the at least one target recommended commodity, the commodity recommendation method further includes: building the commodity recommendation model, the commodity recommendation model including a commodity correlation coefficient matrix, and the commodity correlation coefficient matrix being used for calculating and obtaining recommended commodities with a high degree of correlation with a commodity indicated by the commodity recognition information.

In some embodiments, inputting the commodity recognition information into the commodity recommendation model for purchase demand prediction to obtain the at least one target recommended commodity includes: inputting the commodity recognition information into the commodity recommendation model for purchase demand prediction to obtain N recommended commodity categories, and N being a positive integer; sending information of the N recommended commodity categories to the shopping cart; receiving first indication information sent by the shopping cart, and the first indication information being used to indicate that a user using the shopping cart has selected at least one of the N recommended commodity categories; and determining the at least one target recommended commodity according to the selected at least one recommended commodity category.

In some embodiments, determining the at least one target recommended commodity according to the selected at least one recommended commodity category includes: determining, according to each selected recommended commodity category, one or more commodities with a highest sales volume and/or one or more commodities with a largest price reduction in the selected recommended commodity category.

In some embodiments, before determining the at least one target recommended commodity according to the selected at least one recommended commodity category, the commodity recommendation method further includes: obtaining login information of the user; and obtaining history shopping information of the user according to the login information. The determining the at least one target recommended commodity according to the selected at least one recommended commodity category includes: determining at least one target commodity to be recommended according to the selected at least one recommended commodity category; and revising the at least one target commodity to be recommended according to the history shopping information to obtain the at least one target recommended commodity.

In some embodiments, the at least one target recommended commodity includes a second commodity in a purchase cycle in the history shopping information and/or a third commodity with a target commodity attribute in the history shopping information.

In some embodiments, the at least one target recommended commodity includes at least two target recommended commodities; and after sending the information of the at least one target recommended commodity to the shopping cart, the commodity recommendation method further includes: receiving second indication information sent by the shopping cart, the second indication information being used to indicate that the user using the shopping cart has selected K target recommended commodities in the at least two target recommended commodities, and K being an integer greater than 1; determining a shopping route of the user at least according to a current position of the shopping cart and placement positions of the K target recommended commodities; and sending the shopping route to the shopping cart, and the shopping route being an optimal route for selecting the K target recommended commodities.

In a second aspect, a commodity recommendation method is provided, which is applied to a shopping cart and includes: collecting at least one image of a first commodity, and the first commodity being a commodity placed in the shopping cart; sending the at least one image to a server; receiving information of at least one target recommended commodity sent by the server; and displaying the information of the at least one target recommended commodity.

In some embodiments, the at least one image includes at least two images, and the at least two images are images of the first commodity collected from different viewing angles. The collecting the at least one image of the first commodity includes: collecting the at least two images of the first commodity through at least two collection devices located at different viewing angles in the shopping cart.

In some embodiments, before receiving the information of the at least one target recommended commodity sent by the server, the commodity recommendation method further includes: receiving and displaying information of N recommended commodity categories sent by the server; receiving a first operation of a user using the shopping cart on selection of at least one of the N recommended commodity categories; and sending first indication information to the server in response to the first operation, and the first indication information being used to indicate that the user has selected at least one of the N recommended commodity categories.

In some embodiments, before receiving the information of the at least one target recommended commodity sent by the server, the commodity recommendation method further includes: receiving login information entered by the user using the shopping cart on the shopping cart; and sending the login information to the server.

In some embodiments, the at least one target recommended commodity includes at least two target recommended commodities; and after displaying the information of the at least one target recommended commodity, the commodity recommendation method further includes: receiving a second operation of the user using the shopping cart on selection of K target recommended commodities in the at least two target recommended commodities, K being an integer greater than 1; sending second indication information to the server in response to the second operation, the second indication information being used to indicate that the user has selected the K target recommended commodities in the at least two target recommended commodities; and receiving and displaying a shopping route sent by the server, and the shopping route being an optimal route for selecting the K target recommended commodities.

In a third aspect, a shopping cart is provided, including a shopping cart body, and at least one collection device, a display device, and a transceiver that are disposed on the shopping cart body.

In a fourth aspect, a shopping system is provided, including a server and a plurality of shopping carts. A shopping cart includes a shopping cart body, and at least one collection device, a display device, and a transceiver that are disposed on the shopping cart body. The shopping cart is configured to collect at least one image of a first commodity and send the at least one image to the server, and the first commodity is a commodity placed in the shopping cart. The server is configured to: receive the at least one image sent by the shopping cart; input the at least one image into a commodity recognition model for commodity recognition to obtain commodity recognition information; input the commodity recognition information into a commodity recommendation model for purchase demand prediction to obtain at least one target recommended commodity; and send information of the at least one target recommended commodity to the shopping cart. The shopping cart is further configured to receive the information of the at least one target recommended commodity sent by the server, and display the information of the at least one target recommended commodity.

In some embodiments, the at least one collection device includes at least two collection devices located at different viewing angles. That the shopping cart is configured to collect the at least one image of the first commodity includes: the shopping cart being configured to collect at least two images of the first commodity through the at least two collection devices. That the server is configured to input the at least one image into the commodity recognition model for commodity recognition to obtain the commodity recognition information includes: the server being configured to input the at least two images into the commodity recognition model for commodity recognition to obtain M pieces of commodity category information; and obtain difference information of the M pieces of commodity category information to obtain the commodity recognition information, M being an integer greater than 1.

In some embodiments, the at least one target recommended commodity includes at least two target recommended commodities. The shopping cart is further configured to, after receiving a second operation of the user using the shopping cart on selection of K target recommended commodities in the at least two target recommended commodities, send second indication information to the server in response to the second operation. The second indication information is used to indicate that the user has selected the K target recommended commodities in the at least two target recommended commodities, and K is an integer greater than 1. The server is further configured to receive the second indication information sent by the shopping cart, and determine a shopping route of the user at least according to a current position of the shopping cart and placement positions of the K target recommended commodities; and send the shopping route to the shopping cart. The shopping cart is further configured to receive and display the shopping route sent by the server, and the shopping route is an optimal route for selecting the K target recommended commodities.

In a fifth aspect, a non-transitory computer-readable storage medium is provided, on which a computer program is stored, and when the computer program is executed by a processor, the commodity recommendation method as described in the first aspect is implemented; or when the program is executed by the processor, the commodity recommendation method as described in the second aspect is implemented.

In a sixth aspect, a server is provided, including a memory and a processor. The memory stores a computer program, and when executing the computer program stored in the memory, the processor causes the server to perform the commodity recommendation method as described in the first aspect.

In a seventh aspect, a computer device is provided, including a memory, a processor, and a computer program stored in the memory and capable of running on the processor. When the processor executes the program, the commodity recommendation method as described in the first aspect is implemented; or when the processor executes the program, the commodity recommendation method as described in the second aspect is implemented.

BRIEF DESCRIPTION OF THE DRAWINGS

In order to describe technical solutions in embodiments of the present disclosure more clearly, accompanying drawings to be used in the embodiments will be introduced briefly below. However, the accompanying drawings to be described below are merely some embodiments of the present disclosure, and a person of ordinary skill in the art may obtain other drawings according to these drawings. In addition, the accompanying drawings to be described below may be regarded as schematic diagrams, and are not limitations on actual sizes of products, and actual processes of methods involved in the embodiments of the present disclosure.

DETAILED DESCRIPTION

Technical solutions in some embodiments of the present disclosure will be described clearly and completely below with reference to accompanying drawings. Obviously, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features.

In the description of the embodiments of the present disclosure, "a plurality of," "the plurality of," or "multiple" means two or more unless otherwise specified.

The phrase "A and/or B" includes the following three combinations: only A, only B, and a combination of A and B.

In the description of some embodiments, the terms "connected" and "coupled" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the contents herein.

As used herein, the term "if" is optionally construed as "when", "in a case where", "in response to determining that" or "in response to detecting", depending on the context. Similarly, the phrase "if it is determined that" or "if [a stated condition or event] is detected" is optionally construed as "in a case where it is determined that" or "in response to determining that", or "in a case where [the stated condition or event] is detected" or "in response to detecting [the stated condition or event]", depending on the context.

The phrase "configured to" used herein has an open and inclusive meaning, which does not exclude devices that are applicable to or configured to perform additional tasks or steps.

Shopping at supermarkets (or malls) can not only satisfy users' needs for purchasing daily necessities, but also satisfy users' physical shopping experience. However, the current supermarket shopping model is relatively primitive. Shopping malls and supermarkets only arrange commodities according to categories, and users need to find the commodities that they need, which leads to high cost of time for users to shop at the malls or supermarkets.

Some embodiments of the present disclosure provide a commodity recommendation method, which may be applied to a shopping system, and the shopping system includes a server and a plurality of shopping carts.

Figure 1:
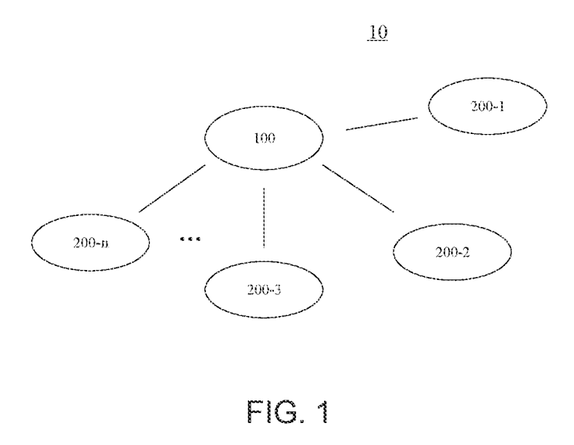
FIG. 1 is a block diagram of a shopping system, in accordance with some embodiments of the present disclosure.

In some examples, as shown in FIG. 1, the shopping system 10 includes a server 100 and a plurality of shopping carts 200-1, 200-2, 200-3, . . . , and 200-$n$, n is a positive integer, and n is greater than or equal to 2 (n≥2). Hereinafter, when there is no need to distinguish the shopping carts, the shopping carts are represented by the mark 200.

Figure 2:
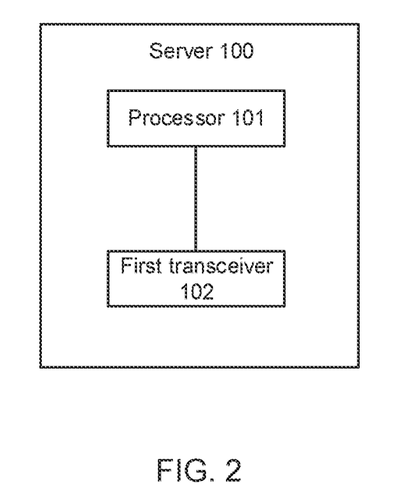
FIG. 2 is a block diagram of a server, in accordance with some embodiments of the present disclosure.

The server 100 may be a central server used in a mall, supermarket or any other shopping place, or a cloud server that provides Internet of Things services for the mall, supermarket or any other shopping place, and a specific form thereof is not limited in the embodiments of the present disclosure. As shown in FIG. 2, the server 100 may include a processor 101 and a first transceiver 102. The processor 101 is configured to perform commodity recognition and commodity recommendation, and the first transceiver 102 is configured to perform information interaction with the plurality of shopping carts.

Figure 3:
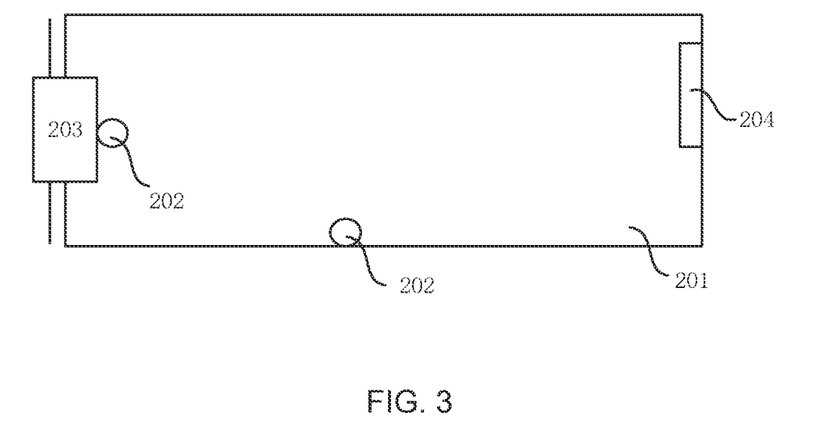
FIG. 3 is a schematic diagram showing a structure of a shopping cart, in accordance with some embodiments of the present disclosure.

As shown in FIG. 3, the shopping cart 200 may include a shopping cart body 201, and at least one collection device 202 (e.g., at least one camera), a display device 203 (e.g., a display screen), and a second transceiver 204 that are disposed on the shopping cart body 201. The collection device 202 is configured to collect image(s) of a commodity placed in the shopping cart body 201, the display device 203 is configured to display commodity information sent by the server 100 to the shopping cart, and the second transceiver 204 is configured to perform information interaction with the first transceiver 102 in the server 100. It will be noted that, there are one or more commodities in the shopping cart body 201, and the collection device 202 may collect the image(s) of each commodity.

In some examples, the first transceiver 102 of the server 100 and the second transceiver 204 of the shopping cart 200 communicate through a wired or wireless network.

Figure 4:
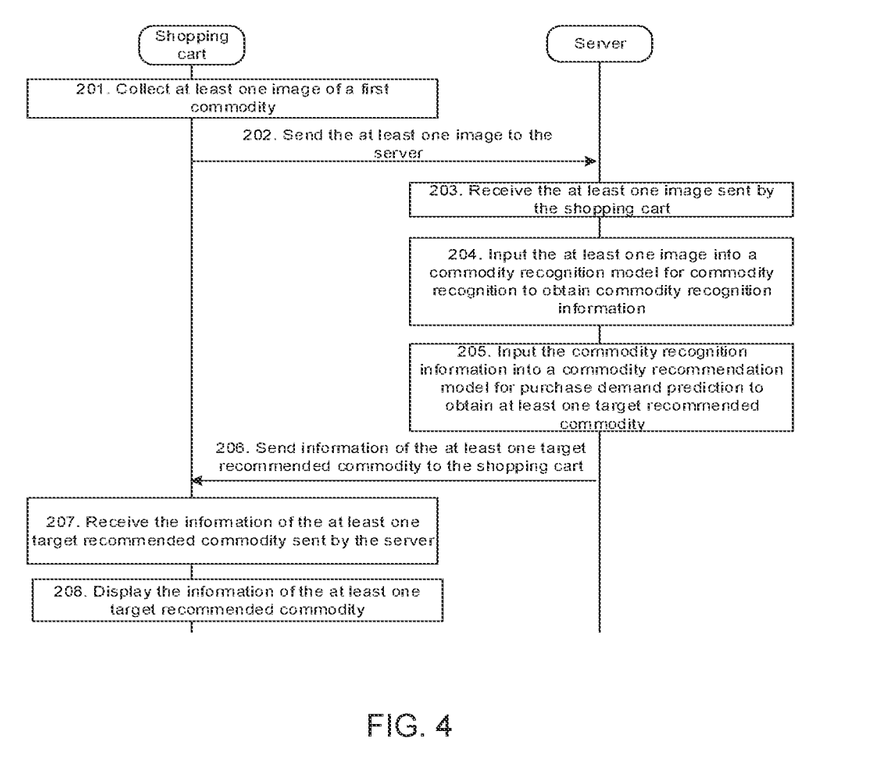
FIG. 4 is a schematic flow diagram of a commodity recommendation method, in accordance with some embodiments of the present disclosure.

As shown in FIG. 4, the commodity recommendation method may include the following steps 201 to 208 (S201 to S208).

In S201, the shopping cart 200 collects at least one image of a first commodity. That is, the at least one collection device 202 of the shopping cart 200 collects the at least one image of the first commodity.

The first commodity is a commodity placed in the shopping cart body 201. The number of first commodities in the shopping cart body 201 may be one or more.

When the user is shopping at a mall, supermarket or any other shopping place, the collection device 202 of the shopping cart 200 used by the user may detect whether there is the commodity in the shopping cart. If the commodity (i.e., the first commodity) is placed in the shopping cart 200, the collection device 202 of the shopping cart 200 may collect the image(s) of the first commodity.

In some embodiments, after the shopping cart 200 starts to move (that is, the shopping cart 200 is started), the collection device 202 of the shopping cart 200 may perform a collection every predetermined time interval (for example, at an interval of 1 minute), so as to accurately obtain the image of the commodity placed in the shopping cart 200.

The embodiments of the present disclosure do not limit the number of the collection devices 202, and those skilled in the art may set an appropriate number of collection devices 202 on the shopping cart body 201 according to actual application requirements.

In some embodiments, collection devices 202 located at a plurality of viewing angles are disposed on the shopping cart body 201, so that image collection of the same commodity may be performed from different viewing angles. Therefore, for any first commodity, a plurality of images of the first commodity at different viewing angles may be obtained. In this way, recognition accuracy of the first commodity may be improved.

In some embodiments, in a case where the at least two collection devices 202 are disposed on the shopping cart body 201, the above S201 may be implemented by the following step 201a (S201a).

In S201a, the at least two collection devices 202 located at different viewing angles in the shopping cart 200 collect at least two images of the first commodity.

In some examples, referring to FIG. 3, the shopping cart 200 includes two collection devices 202, and each collection device is a camera. The two cameras capture images of the first commodity placed in the shopping cart 200 from different viewing angles.

For example, the shopping cart 200 includes a camera disposed at a top-view viewing angle and another camera disposed at a side-view viewing angle, so that the two cameras may obtain a top view and a side view of the first commodity.

It will be noted that exemplary description is made in FIG. 3 only by taking an example in which collection devices 202 (e.g., cameras) are disposed on a long side and a short side of the shopping cart body 201, and the embodiments of the present disclosure is not limited thereto. In actual implementation, the collection devices 202 may also be disposed at other positions of the shopping cart, so that the plurality of collection devices may collect comprehensive images of the commodity placed in the shopping cart 200.

In S202, the shopping cart 200 sends the at least one image of the first commodity to the server 100. That is, the second transceiver 204 of the shopping cart 200 sends the at least one image of the first commodity to the server 100.

In S203, the server 100 receives the at least one image of the first commodity sent by the shopping cart.

In S204, the server 100 inputs the at least one image of the first commodity into a commodity recognition model for commodity recognition to obtain commodity recognition information.

After the shopping cart collects the at least one image of the first commodity, the second transceiver 204 of the shopping cart 200 may send the at least one image to the server 100. After receiving the at least one image, the server 100 may input the at least one image into the commodity recognition model for commodity recognition, so that the commodity recognition information of the first commodity may be obtained.

In some embodiments, the commodity recognition information includes at least one of commodity attribute information, commodity category information, and commodity specification information. Of course, the commodity recognition information may also include any other possible information, which may be specifically determined according to actual needs, and is not limited in the embodiments of the present disclosure.

In an example where the commodity recognition information includes commodity category information, in a case where the at least one image of the first commodity includes the at least two images, and the at least two images are images of the first commodity collected from different viewing angles, the above S204 may be implemented by the following steps 204a and 204b (S204a and S204b).

In S204a, the server inputs the at least two images into the commodity recognition model for commodity recognition to obtain M pieces of commodity category information. M is an integer greater than 1.

In S204b, the server 100 obtains difference information of the M pieces of commodity category information, so as to obtain the commodity recognition information.

After obtaining the M pieces of commodity category information, the server may perform union processing on the M pieces of commodity category information, and the processed information is used as a recognition result to obtain the commodity recognition information.

It will be noted that the number (i.e., M) of pieces of commodity category information may be equal to or less than the number of the at least two images. For example, the at least two images include two images, and the server 100 inputs the two images into the commodity recognition model for commodity recognition, and may obtain two pieces of commodity category information.

In S205, the server 100 inputs the commodity recognition information into a commodity recommendation model for purchase demand prediction to obtain at least one target recommended commodity.

In S206, the server 100 sends information of the at least one target recommended commodity to the shopping cart 200. That is, the first transceiver 102 of the server 100 sends the information of the target recommended commodity to the second transceiver 204 of the shopping cart 200.

In S207, the shopping cart 200 receives the information of the at least one target recommended commodity sent by the server 100. That is, the second transceiver 204 of the shopping cart 200 receives the information of the target recommended commodity sent by the first transceiver 102 of the server 100.

In S208, the shopping cart 200 displays the information of the at least one target recommended commodity. That is, the display device 203 of the shopping cart 200 displays the information of the target recommended commodity.

In the embodiments of the present disclosure, after obtaining the commodity recognition information, the server inputs the commodity recognition information into the commodity recommendation model for purchase demand prediction to obtain the target recommended commodity. Then, the server sends the information of the target recommended commodity to the shopping cart, so that after receiving the information of the target recommended commodity, the shopping cart may display the information of the target recommended commodity on its display device such as the display screen. Therefore, the server may predict the user's purchase intention according to the commodity in the shopping cart placed by the user, so that commodities that meet the user's purchase demands may be recommended to the user. In this way, personalized and convenient shopping experience may be provided for each user's purchase demands, shopping efficiency may be improved, and operating efficiency of shopping malls and supermarkets may be improved.

In some embodiments, before inputting the at least one image of the first commodity into the commodity recognition model for commodity recognition to obtain the commodity recognition information in S204, the server 100 may first trains a recognition network model to obtain the commodity recognition model. A training process of the recognition network model may include steps 209 to 212 (S209 to S212).

In S209, the recognition network model is built.

Figure 5:
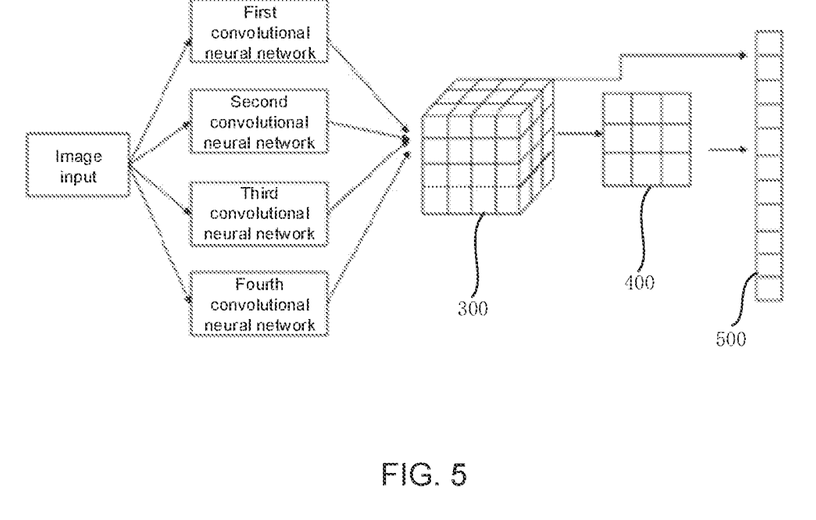
FIG. 5 is a schematic diagram of a commodity recognition model, in accordance with some embodiments of the present disclosure.

The recognition network model includes a feature extractor, and the feature extractor includes a plurality of convolutional neural networks, and an aggregation unit that performs aggregation processing on the plurality of convolutional neural networks.

Referring to the schematic diagram of the recognition network model shown in FIG. 5, the recognition network model may be constructed using an object detection model based on a principle of single shot multibox detector (SSD). The recognition network model includes mixed convolutional layers of the plurality of convolutional neural networks, and the aggregation unit that performs aggregation processing on each convolutional layer. The mixed convolutional layers and the aggregation unit may form the complete feature extractor 300. The recognition network model further includes convolutional layers 400 located at an output terminal of the feature extractor 300, and a classification and regression fitting unit 500. The classification and regression fitting unit 500 may use output of each layer as input data for classification and regression fitting. In some examples, the feature extractor 300 may include four different convolutional layers (also referred to as convolutional neural networks), and a first convolutional neural network is Inception V3, a second convolutional neural network is Inception V4, a third convolutional neural network is Resnet 50, and a fourth convolutional neural network is Resnet 101.

In some examples, the recognition network model may also include a loss function that performs classification tasks. For example, L2 loss is used as the loss function for position regression, two loss functions are combined as an overall loss function, and the amplified data is input for training to obtain the commodity recognition model.

In S210, image processing and annotation are performed on sample images to obtain training samples.

Tags annotated in the training sample include a boundary box of a sample commodity and a commodity category of the sample commodity, and the sample commodity is a commodity corresponding to the sample image.

The sample images may be images of commodities on sale in a shopping mall (or supermarket), and may include images at various angles and of various specifications (or sizes). Compared with a general square tag, irregular tags are obtained by cutting out a large number of irregular boundary boxes along boundaries of the sample commodities, which may increase accuracy of a result of feature learning.

In S211, amplification processing is performed on the training samples.

In order to enrich training image dataset to cover actual use scene as much as possible, a series of simulations and amplification processing may be performed on the images, such as dividing the boundary boxes of the images of the commodities, then combining and splicing the images according to a random number and category(s), and adding shadows on the boundaries of the images to simulate an actual shopping scene. In addition, random color processing, hue processing, brightness processing, Gaussian noise addition processing, etc. may be performed on an entire image of the commodity, so that a boundary box of an object becomes a tag for the actual model training, and each box corresponds to a corresponding category.

In the embodiments of the present disclosure, sample amplification is performed based on the tags obtained through the boundary boxes of the images, and more shopping scenes may be amplified based on the existing commodity images, so that the accuracy of the result of the feature learning may be improved.

In S212, the amplified training samples are input into the recognition network model for training to obtain the commodity recognition model.

For example, referring to FIG. 5, the amplified training samples are input into the recognition network model, and features of the training samples are extracted through the plurality of convolutional neural networks to train the feature extractor, then the features extracted by the convolutional neural networks are aggregated, and the aggregated features are output to the convolutional layers located at the output terminal of the feature extractor 300. The output of each layer is input as input data into the classification and regression fitting unit, CrossEntropy Loss is selected as the loss function for the classification tasks, L2 loss is used as the loss function for the position regression, the two loss functions are combined as an overall loss function, and the previously amplified data is input to train the recognition network model.

Since the recognition network model has multiple types of convolutional layers, feature extraction of the commodity recognition model obtained through training is high in accuracy and has good flexibility. Moreover, the boundary box of the sample commodity is used as the tag for annotation, which may generate a plurality of combination modes in combinations and splicing, and increase the number and types of training samples, thereby effectively increasing the shopping scenes applied in the model training process, and making the application scenes of the commodity recognition model obtained through training more extensive.

The trained commodity recognition model is stored in the server 100.

In some embodiments, before the commodity recognition information is input into the commodity recommendation model for purchase demand prediction to obtain at least one target recommended commodity in S205, the commodity recommendation method may further include step 213 (S213).

In S213, the commodity recommendation model is built.

The commodity recommendation model may include a commodity correlation coefficient matrix, and the commodity correlation coefficient matrix may be used for calculating and obtaining recommended commodities with a high degree of correlation with a commodity indicated by the commodity recognition information. In some examples, the degree of correlation is greater than or equal to 85%, and less than or equal to 100%. For example, the degree of correlation is 90%.

For each commodity, a correlation coefficient matrix may be obtained by calculating the correlation between other categories of commodities and the commodity, and then the correlation coefficient matrix may be used to calculate recommended commodities with a high degree of correlation with the commodity (e.g., the above-mentioned first commodity) indicated by the commodity recognition information that is received.

In some embodiments, the commodity recommendation model may obtain a preset number of recommended commodities. For example, the recommended commodities may be five recommended commodities with the highest degree of correlation with the commodity indicated by the commodity recognition information.

In some embodiments, the commodity recommendation model may be a data mining model constructed and trained based on a large number of shopping records in a mall or supermarket as input parameters and using the correlation coefficient matrix. Of course, in actual implementation, the commodity recommendation model may also be obtained through other sample trainings, which may be determined according to actual usage requirements, and is not limited in the embodiments of the present disclosure.

In some embodiments, the above S205 (that is, the commodity recognition information is input into the commodity recommendation model for purchase demand prediction to obtain at least one target recommended commodity) may include the following steps 205a to 205g (S205a to S205g).

In S205a, the server inputs the commodity recognition information into the commodity recommendation model for purchase demand prediction to obtain N recommended commodity categories, and N is a positive integer.

In S205b, the server sends information of the N recommended commodity categories to the shopping cart.

In S205c, the shopping cart receives and displays the information of the N recommended commodity categories sent by the server. That is, the display device of the shopping cart receives and displays the information of the N recommended commodity categories sent by the server.

In S205d, the shopping cart receives a first operation of a user using the shopping cart on selection of at least one of the N recommended commodity categories.

For example, an integrated circuit (IC) in the display device of the shopping cart receives the selection of at least one of the N recommended commodity categories by the user using the shopping cart.

In some embodiments, the first operation may be a single-click operation, a double-click operation, or a long-press operation of the user using the shopping cart on information of a pre-selected recommended commodity category, which may be determined according to actual usage requirements, and is not limited in the embodiments of the present disclosure.

In S205e, the shopping cart sends first indication information to the server in response to the first operation. The first indication information may be used to indicate that the user using the shopping cart has selected at least one of the N recommended commodity categories.

For example, the IC in the display device of the shopping cart sends the first indication information to the second transceiver of the shopping cart in response to the first operation, and then the second transceiver sends the first indication information to the processor of the server.

In S205f, the server receives the first indication information sent by the shopping cart.

In S205g, the server determines the at least one target recommended commodity according to the selected at least one recommended commodity category.

In some examples, the server determines, according to each selected recommended commodity category, one or more commodities with the highest sales volume and/or one or more commodities with the largest price reduction in the selected recommended commodity category as the target recommended commodity(s).

That is, the at least one target recommended commodity includes one or more commodities with the highest sales volume and/or one or more commodities with the largest price reduction in each selected recommended commodity category.

In the embodiments of the present disclosure, since the server may send the information of the N recommended commodity categories to the shopping cart after obtaining the N recommended commodity categories, the user can select the recommended commodity category according to his/her own shopping needs. Therefore, the server may recommend commodity(s) belonging to the selected recommended commodity category to the user, and further the server may make more accurate commodity recommendations according to the user's selection. In this way, shopping efficiency may be further improved.

In order to recommend commodities to the user more accurately, in some embodiments, before the above S205g, the commodity recommendation method may further include the following steps 214 to 217 (S214 to S217). On this basis, S205g may include the following steps 205g1 and 205g2 (S205g1 and S205g2).

In S214, the shopping cart receives login information entered on the shopping cart by the user using the shopping cart.

In S215, the shopping cart sends the login information to the server.

In S216, the server obtains the login information of the user.

In S217, the server obtains history shopping information of the user according to the login information.

In some examples, the login information includes a user account and a login password. When using the shopping cart, the user may enter the user account and the login password (i.e., the login information) on the shopping cart, so that the shopping cart logs in to the user account. For example, the user enters his/her user account and login password on a user interface on the display device of the shopping cart, and login request information for requesting to log in to the user account is sent to the server through the second transceiver of the shopping cart. The login request information may include the user account and the login password of the user.

It will be understood that the user account may be registered by the user on the shopping system before this shopping, or registered through the user interface on the shopping cart, or registered on an online platform of the mall, supermarket or other shopping places or an authorized associated application thereof through other user terminals.

In addition, in a case where the user has not registered an account before this shopping, the user may first apply for registration of a user account to the server through the above methods, and then request to log in to the user account. Of course, the user may directly use the shopping cart without registering the user account.

After the server obtains the login information of the user using the shopping cart, the server may obtain the users history shopping information stored in the server according to the login information, and then determine the target recommended commodity according to the history shopping information and the selected recommended commodity category.

In S205g1, the server determines at least one target commodity to be recommended according to the selected at least one recommended commodity category.

In S205g2, the server revises the at least one target commodity to be recommended according to the history shopping information to obtain the at least one target recommended commodity.

For example, the at least one target recommended commodity includes a second commodity in a purchase cycle in the history shopping information, and/or a third commodity with a target commodity attribute in the history shopping information.

The server may obtain a purchase cycle of at least one target commodity to be recommended according to the history shopping information, and then recommend a commodity to be recommended in the purchase cycle as the target recommended commodity to the user; and/or, the server may obtain, from the history shopping information, a commodity attribute (i.e., the target commodity attribute) of the commodity that the user purchased in history, and then select, from the at least one target commodity to be recommended, a commodity having the same or similar attribute as the commodity as the target recommended commodity. The commodity attribute may include a brand, specification, type, etc. of a commodity.

For example, the server obtains the users usage frequency of a certain daily necessity through the users history shopping information, and uses this data to build a commodity consumption estimation model for the user to estimate consumption time of the daily necessity. According to the purchase records of the user, if an estimation result shows that the user's daily necessity is about to be used up by using the commodity consumption evaluation model, the server revises a recommendation result, and recommend such commodities, and the recommend commodities will give priority to the brands and specifications that the user has purchased.

In some embodiments, the server 100 may also determine the target recommended commodity according to personal information of the user using the shopping cart 200. The users personal information may include at least one of the users identity information, age information, gender information, family member information, and work information.

In some embodiments, the server 100 may build a user demand model, which includes a decision tree model. The decision tree model outputs a corresponding user tag according to the obtained personal information of the user, and outputs corresponding predicted shopping information according to the user tag.

In some examples, the server builds the decision tree model based on the big data of the shopping mall or supermarket. For example, the model is built based on factors such as the users age, gender, number of family members, and nature of work, the user is classified, a purchase possibility of a commodity in the shopping mall or supermarket is estimated, and a commodity combination with a maximum probability is calculated under each category.

For each tag for people, a commodity recommendation combination model may be built based on the "0-1" planning principle:

$$\max \Sigma p_i x_i; \text{ and}$$

$$s.t.\ f(x) \leq B.$$

$x_i$ is whether to buy a commodity of category i, x is a matrix thereof, $p_i$ is a profit of the i commodity, f( ) is the commodity characteristics, which is fitted according to factors such as sales, scores, and unit price, and B is shopping experience index, which is fitted according to factors such as a total price and weight of a product.

The recommendation combination with the maximum probability generated under the recommendation decision logic realizes commodity combination recommendation based on user tags, i.e., predicted shopping information. Therefore, the predicted shopping information may be used to revise the target commodity to be recommended to obtain the target recommended commodity.

In a case where the at least one target recommended commodity includes at least two target recommended commodities, after the above S208, the commodity recommendation method provided in the embodiments of the present disclosure may further include the following steps 218 to 223 (S218 to S223).

In S218, the shopping cart receives a second operation of the user using the shopping cart on selection of K target recommended commodities in the at least two target recommended commodities, and K is an integer greater than 1.

In S219, the shopping cart sends second indication information to the server in response to the second operation.

The second indication information may be used to indicate that the user using the shopping cart has selected K target recommended commodities in the at least two target recommended commodities.

In S220, the server receives the second indication information sent by the shopping cart.

In S221, the server determines a shopping route of the user at least according to a current position of the shopping cart and placement positions of the K target recommended commodities.

The shopping route is an optimal route for selecting the K target recommended commodities.

In S222, the server sends the shopping route to the shopping cart.

In S223, the shopping cart receives and displays the shopping route sent by the server.

In some examples, the server determines the user's shopping route according to the current position of the shopping cart, a position of the checkout counter, and the placement positions of the K target recommended commodities. In this way, the server may determine the optimal route (e.g., a route with a shortest distance) for selecting the K target recommended commodities.

It will be noted that when there is no commodity in the shopping cart (that is, the server does not receive any image of the commodity), or the server does not recognize a valid commodity from the received images of the commodity(s), the input of the commodity recommendation model of the server is empty. Then the processor of the server may perform sorting according to at least one of a current sales record and the price reduction, and send the top-ranked commodities to the shopping cart as the target recommended commodities, so that the user may choose the commodities they want to buy from the target recommended commodities.

Some embodiments of the present disclosure provide a shopping system. As shown in FIG. 1, the shopping system includes the server 100 of the above embodiments and a plurality of shopping carts 200 of the above embodiments. Any of the plurality of shopping carts 200 is configured to collect at least one image of a first commodity, and send the at least one image of the first commodity to the server, and the first commodity is a commodity placed in the shopping cart 200. The server 100 is configured to: receive the at least one image of the first commodity sent by the shopping cart; input the at least one image of the first commodity into a commodity recognition model for commodity recognition to obtain commodity recognition information; input the commodity recognition information into a commodity recommendation model for purchase demand prediction to obtain at least one target recommended commodity; and send information of the at least one target recommended commodity to the shopping cart. The shopping cart 200 is further configured to receive the information of the at least one target recommended commodity sent by the server 100, and display the information of the at least one target recommended commodity.

In some embodiments, in a case where at least two collection devices 202 located at different viewing angles are disposed on the shopping cart body 201, that the shopping cart 200 is configured to collect at least one image of the first commodity includes: the shopping cart 200 being configured to collect at least two images of the first commodity through the at least two collection devices 202 located at different viewing angles in the shopping cart 200.

That the server 100 is configured to input the at least one image into the commodity recognition model for commodity recognition to obtain the commodity recognition information includes: the server 100 being configured to input the at least two images into the commodity recognition model for commodity recognition to obtain M pieces of commodity category information; and obtain difference information of the M pieces of commodity category information, so as to obtain the commodity recognition information. M is an integer greater than 1.

In some embodiments, the server 100 is further configured to build a recognition network model. The recognition network model includes a feature extractor, and the feature extractor includes a plurality of convolutional neural networks, and an aggregation unit that performs aggregation processing on the plurality of convolutional neural networks. A specific training process of the recognition network model may be referred to the above, and will not be repeated here.

In some embodiments, the server 100 is further configured to build the commodity recommendation model. The commodity recommendation model includes a commodity correlation coefficient matrix, and the commodity correlation coefficient matrix is used to calculate recommended commodities with a high degree of correlation with a commodity indicated by the commodity recognition information.

In some embodiments, the server 100 is configured to input the commodity recognition information into the commodity recommendation model for purchase demand prediction to obtain N recommended commodity categories, and N being a positive integer; and send information of the N recommended commodity categories to the shopping cart 200. The shopping cart 200 is further configured to receive and display the information of the N recommended commodity categories sent by the server 100; receive a first operation of the user using the shopping cart 200 on selection of at least one of the N recommended commodity categories; and send first indication information to the server 100 in response to the first operation. The server 100 is further configured to receive the first indication information sent by the shopping cart 200, and the first indication information being used to indicate that the user using the shopping cart 200 has selected at least one of the N recommended commodity categories; and determine the at least one target recommended commodity according to the selected at least one recommended commodity category.

In some examples, the at least one target recommended commodity includes commodities with the highest sales volume and/or the largest price reduction in each recommended commodity category that is selected.

In some embodiments, the shopping cart 200 is further configured to receive login information entered on the shopping cart 200 by the user using the shopping cart 200, and send the login information to the server. The server 100 is further configured to obtain the login information of the user; and obtain history shopping information of the user according to the login information. On this basis, that the server 100 is configured to determine the at least one target recommended commodity according to the selected at least one recommended commodity category includes: the server 100 being configured to determine at least one target commodity to be recommended according to the selected at least one recommended commodity category; and revise the at least one target commodity to be recommended according to the history shopping information to obtain the at least one target recommended commodity.

In some embodiments, the at least one target recommended commodity includes at least one of a second commodity in a purchase cycle in the history shopping information and/or a third commodity with a target commodity attribute in the history shopping information.

In some embodiments, the at least one target recommended commodity includes at least two target recommended commodities; and the shopping cart 200 is further configured to, after receiving a second operation of the user using the shopping cart 200 on selection of K target recommended commodities in the at least two target recommended commodities, send second indication information to the server 100 in response to the second operation. K is an integer greater than 1. The second indication information may be used to indicate that the user using the shopping cart has selected K target recommended commodities in the at least two target recommended commodities. The server 100 is further configured to receive the second indication information sent by the shopping cart 200, and determine a shopping route of the user at least according to the current position of the shopping cart 200 and the placement positions of the K target recommended commodities; and send the shopping route to the shopping cart 200. The shopping cart 200 is further configured to receive and display the shopping route sent by the server 100. The shopping route is an optimal route for selecting the K target recommended commodities.

In the shopping system provided in the embodiments of the present disclosure, since the server 100 may predict the user's purchase intention according to the commodities placed in the shopping cart 200 by the user, it may recommend commodities that meet the user's purchase demands to the user. In this way, personalized and convenient shopping experience may be provided for each user, so that shopping efficiency may be improved, and operating efficiency of shopping malls and supermarkets may be improved.

Some embodiments of the present disclosure provide a non-transitory computer-readable storage medium on which a computer program is stored. When the program is executed by a processor, it implements: receiving at least one image of a first commodity sent by a shopping cart 200, and the first commodity being a commodity placed in the shopping cart 200; inputting the at least one image of the first commodity into a commodity recognition model for commodity recognition to obtain commodity recognition information; inputting the commodity recognition information into a commodity recommendation model for purchase demand prediction to obtain at least one target recommended commodity; and sending information of the at least one target recommended commodity to the shopping cart 200.

Some embodiments of the present disclosure provide a non-transitory computer-readable storage medium on which a computer program is stored. When the program is executed by a processor, it implements: receiving at least one image of a first commodity, and the first commodity being a commodity placed in the shopping cart 200; sending the at least one image of the first commodity to a server 100; receiving information of at least one target recommended commodity sent by the server 100; and displaying the information of the at least one target recommended commodity.

In practical applications, the non-transitory computer-readable storage medium may adopt any combination of one or more non-transitory computer-readable storage media. The non-transitory computer-readable storage medium may include: a portable computer disk, a hard disk, a random access memory (RAM), a read-only memory (ROM), an erasable programmable read-only memory (EPROM), flash memory, an optical fiber, a portable compact disk read-only memory (CD-ROM), an optical storage device, a magnetic storage device, or any suitable combination of the above. In the above embodiments, the non-transitory computer-readable storage medium may be any tangible medium that contains or stores a program, and the program may be used by or in combination with an instruction execution system, apparatus, or element.

Figure 6:
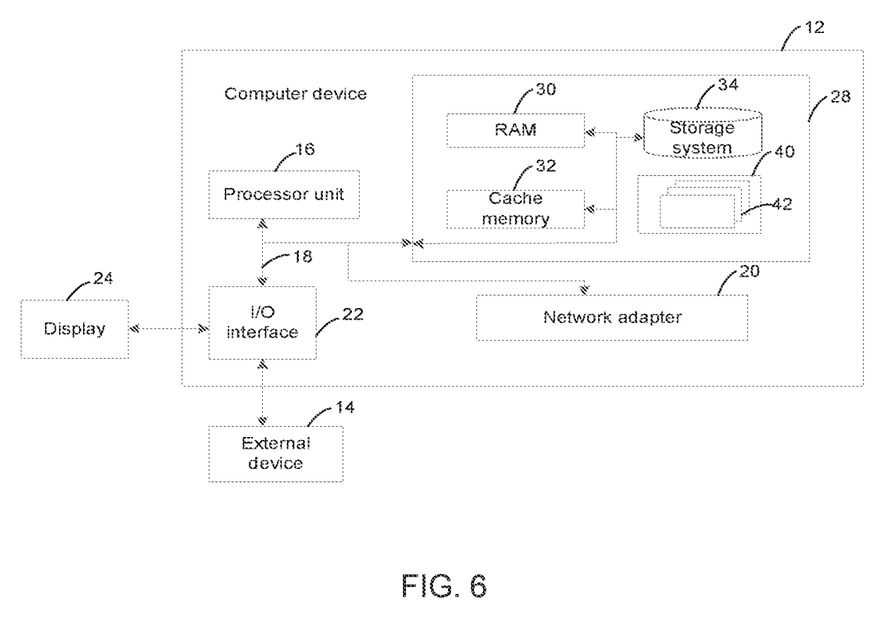
FIG. 6 is a schematic diagram showing a structure of a computer device, in accordance with some embodiments of the present disclosure.

As shown in FIG. 6, some embodiments of the present disclosure provide a computer device. The computer device 12 shown in FIG. 6 is only an example, and should not limit the functions and scope of the embodiments of the present disclosure. The computer device shown in FIG. 6 may be the server 100, a computer device installed on the shopping cart 200, a computer device integrated in the display device 203 of the shopping cart 200, or other devices.

As shown in FIG. 6, the computer device 12 is shown in a form of a general-purpose computing device. Components of the computer device 12 may include, but are not limited to: one or more processors 16, a system memory 28, and buss 18 connecting different system components (including the system memory 28 and the processor processor(s) 16).

The buss 18 represents one or more of several types of bus structures, including a memory bus or a memory controller bus, a peripheral bus, a graphics acceleration port, or a local bus using any of multiple bus structures. For example, the bus structures include, but are not limited to, Industry Standard Architecture (ISA) bus, Micro Channel Architecture (MAC) bus, Enhanced ISA bus, Video Electronics Standards Association (VESA) local bus, and Peripheral Component Interconnect (PCI) bus.

The computer device 12 includes a variety of computer system readable media. These media may be any available media that can be accessed by the computer device 12, including volatile and non-volatile media, removable and non-removable media.

The system memory 28 may include computer system readable media in a form of volatile memory, such as a random access memory (RAM) 30 and/or a cache memory 32. The computer device 12 may further include other removable/non-removable, volatile/non-volatile computer system storage media. For example only, a storage system 34 in the system memory 28 may be used to read from and write to a non-removable and non-volatile magnetic medium (generally referred to as "hard disk driver"). A magnetic disk driver that reads from and writes to a removable non-volatile magnetic disk (e.g., a "floppy disk") and a compact disk driver that reads from and writes to a removable non-volatile compact disc (e.g., CD-ROM, DVD-ROM, or other optical media). In these cases, each driver may be connected to the bus 18 through one or more data media interfaces.

A program/utility tool 40 having a set of program modules 42 (at least one program module 42) may be stored in, for example, the system memory 28. Such program module 42 includes, but is not limited to, an operating system, one or more application programs, other program modules and program data. The program module 42 generally performs the functions and/or methods in the embodiments described in the present disclosure.

The computer device 12 may also communicate with one or more external devices 14 (e.g., a keyboard, a pointing device, and a display 24), and may also communicate with one or more devices that enable a user to interact with the computer device 12, and/or any device (e.g., a network card, a modem, etc.) that enables the computer device 12 to communicate with one or more other computing devices. Such communication may be performed through an input/output (I/O) interface 22. In addition, the computer device 12 may also communicate with one or more networks (e.g., a local area network (LAN), a wide area network (WAN), and/or a public network, such as an Internet) through a network adapter 20. As shown in FIG. 6, the network adapter 20 communicates with other components of the computer device 12 through the bus 18. It will be understood that other hardware and/or software modules may be used in combination with the computer device 12, including, but not limited to: a microcode, a device driver, a redundant processing unit, an external disk drive array, a RAID system, a tape drive, and a data backup storage system.

The processor unit 16 executes various functional applications and data processing by running programs stored in the system memory 28, for example, the commodity recommendation method provided in the embodiments of the present disclosure is implemented.

Obviously, the above-mentioned embodiments of the present disclosure are merely examples to clearly illustrate the present disclosure, and are not intended to limit the implementations of the present disclosure. For those of ordinary skill in the art, other different forms of changes or alterations may be made on a basis of the above description, and all embodiments cannot be exhaustively listed herein. Any obvious changes or alterations derived from the technical solutions of the present disclosure are still within the protection scope of the present disclosure.

What is claimed is:

1. A commodity recommendation method, applied to a server, comprising:
   receiving at least one image of a first commodity sent by a shopping cart, the first commodity being a commodity placed in the shopping cart;
   inputting the at least one image into a commodity recognition model for commodity recognition to obtain commodity recognition information;
   inputting the commodity recognition information into a commodity recommendation model for purchase demand prediction to obtain at least one target recommended commodity; and
   sending information of the at least one target recommended commodity to the shopping cart,
   wherein before inputting the at least one image into the commodity recognition model for commodity recognition to obtain the commodity recognition information, the commodity recommendation method further comprises:
      building an recognition network model, the recognition network model including a feature extractor, and the feature extractor including a plurality of convolutional neural networks, and an aggregation unit that performs aggregation processing on the plurality of convolutional neural networks;
      performing image processing and annotation on sample images to obtain training samples, tags annotated in a training sample including an irregular boundary box of a sample commodity and a commodity category of the sample commodity, and the sample commodity being a commodity corresponding to a sample image;
      performing amplification processing on the training samples; and
      inputting the amplified training samples into the recognition network model for training to obtain the commodity recognition model.

2. The commodity recommendation method according to claim 1, wherein the at least one image includes at least two images, and the at least two images are images of the first commodity collected from different viewing angles; and
   inputting the at least one image into the commodity recognition model for commodity recognition to obtain the commodity recognition information includes:
      inputting the at least two images into the commodity recognition model for commodity recognition to obtain M pieces of commodity category information; M being an integer greater than 1; and
      obtaining difference information of the M pieces of commodity category information to obtain the commodity recognition information.

3. The commodity recommendation method according to claim 1, wherein before inputting the commodity recognition information into the commodity recommendation model for purchase demand prediction to obtain the at least one target recommended commodity, the commodity recommendation method further comprises:
   building the commodity recommendation model, the commodity recommendation model including a commodity correlation coefficient matrix, and the commodity correlation coefficient matrix being used for calculating and obtaining recommended commodities with a high degree of correlation with a commodity indicated by the commodity recognition information.

4. The commodity recommendation method according to claim 1, wherein inputting the commodity recognition information into the commodity recommendation model for purchase demand prediction to obtain the at least one target recommended commodity includes:
   inputting the commodity recognition information into the commodity recommendation model for purchase demand prediction to obtain N recommended commodity categories, N being a positive integer;
   sending information of the N recommended commodity categories to the shopping cart;
   receiving first indication information sent by the shopping cart, and the first indication information being used to indicate that a user using the shopping cart has selected at least one of the N recommended commodity categories; and
   determining the at least one target recommended commodity according to selected at least one recommended commodity category.

5. The commodity recommendation method according to claim 4, wherein determining the at least one target recommended commodity according to the selected at least one recommended commodity category includes:
   determining, according to each selected recommended commodity category, one or more commodities with a highest sales volume and/or one or more commodities with a largest price reduction in the selected recommended commodity category as the at least one target recommended commodity.

6. The commodity recommendation method according to claim 4, wherein before determining the at least one target recommended commodity according to the selected at least one recommended commodity category, the commodity recommendation method further comprises:
   obtaining login information of the user; and
   obtaining history shopping information of the user according to the login information; and
   determining the at least one target recommended commodity according to the selected at least one recommended commodity category includes:
      determining at least one target commodity to be recommended according to the selected at least one recommended commodity category; and
      revising the at least one target commodity to be recommended according to the history shopping information to obtain the at least one target recommended commodity.

7. The commodity recommendation method according to claim 1, wherein the at least one target recommended commodity includes at least two target recommended commodities; and after sending the information of the at least one target recommended commodity to the shopping cart, the commodity recommendation method further comprises:

receiving second indication information sent by the shopping cart, the second indication information being used to indicate that a user using the shopping cart has selected K target recommended commodities in the at least two target recommended commodities, and K being an integer greater than 1;

determining a shopping route of the user at least according to a current position of the shopping cart and placement positions of the K target recommended commodities; and sending the shopping route to the shopping cart, the shopping route being an optimal route for selecting the K target recommended commodities.

8. A server, comprising a memory and a processor, the memory storing a computer program, and when executing the computer program stored in the memory, the processor causing the server to perform the commodity recommendation method according to claim 1.

9. A non-transitory computer-readable storage medium on which a computer program is stored, wherein when the computer program is executed by a processor, the commodity recommendation method according to claim 1 is implemented.

10. A shopping system, comprising:

a plurality of shopping carts, wherein a shopping cart of the plurality of shopping carts includes a shopping cart body, and at least one collection device, a display device, and a transceiver that are disposed on the shopping cart body; and the shopping cart of the plurality of shopping carts is configured to collect at least one image of a first commodity and send the at least one image to a server, and the first commodity is a commodity placed in the shopping cart; and a server configured to:

receive the at least one image sent by the shopping cart;

input the at least one image into a commodity recognition model for commodity recognition to obtain commodity recognition information;

input the commodity recognition information into a commodity recommendation model for purchase demand prediction to obtain at least one target recommended commodity; and send information of the at least one target recommended commodity to the shopping cart, wherein before inputting the at least one image into the commodity recognition model for commodity recognition to obtain the commodity recognition information, the server is configured to:

build an recognition network model, the recognition network model including a feature extractor, and the feature extractor including a plurality of convolutional neural networks, and an aggregation unit that performs aggregation processing on the plurality of convolutional neural networks;

perform image processing and annotation on sample images to obtain training samples, tags annotated in a training sample including an irregular boundary box of a sample commodity and a commodity category of the sample commodity, and the sample commodity being a commodity corresponding to a sample image;

perform amplification processing on the training samples; and input the amplified training samples into the recognition network model for training to obtain the commodity recognition model; and wherein the shopping cart is further configured to receive the information of the at least one target recommended commodity sent by the server, and display the information of the at least one target recommended commodity.

11. The shopping system according to claim 10, wherein the at least one collection device includes at least two collection devices located at different viewing angles;

that the shopping cart is configured to collect the at least one image of the first commodity includes: the shopping cart being configured to collect at least two images of the first commodity through the at least two collection devices; and that the server is configured to input the at least one image into the commodity recognition model for commodity recognition to obtain the commodity recognition information includes: the server being configured to input the at least two images into the commodity recognition model for commodity recognition to obtain M pieces of commodity category information; and obtain difference information of the M pieces of commodity category information to obtain the commodity recognition information, M being an integer greater than 1.

12. The shopping system according to claim 10, wherein the at least one target recommended commodity includes at least two target recommended commodities;

the shopping cart is further configured to, after receiving a second operation of a user using the shopping cart on selection of K target recommended commodities in the at least two target recommended commodities, send second indication information to the server in response to the second operation, wherein the second indication information is used to indicate that the user has selected the K target recommended commodities in the at least two target recommended commodities, and K is an integer greater than 1;

the server is further configured to receive the second indication information sent by the shopping cart, and determine a shopping route of the user at least according to a current position of the shopping cart and placement positions of the K target recommended commodities; and send the shopping route to the shopping cart; and the shopping cart is further configured to receive and display the shopping route sent by the server, and the shopping route is an optimal route for selecting the K target recommended commodities.

\* \* \* \* \*